(12) United States Patent
Goto

(10) Patent No.: US 11,463,010 B2
(45) Date of Patent: Oct. 4, 2022

(54) APPARATUS FOR IDENTIFYING SWITCH OF SWITCHING MODULE

(71) Applicant: YAZAKI CORPORATION, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/191,727

(22) Filed: Mar. 4, 2021

(65) Prior Publication Data

US 2021/0281181 A1 Sep. 9, 2021

(30) Foreign Application Priority Data

Mar. 6, 2020 (JP) .............................. JP2020-038742

(51) Int. Cl.
*H02M 3/335* (2006.01)
*B60K 35/00* (2006.01)

(52) U.S. Cl.
CPC ......... *H02M 3/33507* (2013.01); *B60K 35/00* (2013.01); *B60K 2370/46* (2019.05)

(58) Field of Classification Search
None
See application file for complete search history.

(56) References Cited

U.S. PATENT DOCUMENTS

| 5,990,571 | A | | 11/1999 | Sato et al. |
| 6,008,664 | A | * | 12/1999 | Jett ..................... G01R 19/0023 |
| | | | | 324/762.02 |
| 8,525,433 | B2 | * | 9/2013 | Lee ......................... H05B 45/37 |
| | | | | 315/307 |
| 8,680,835 | B2 | * | 3/2014 | Hung ....................... H02M 1/32 |
| | | | | 315/219 |
| 9,497,805 | B2 | * | 11/2016 | Yagi ........................ H05B 44/00 |
| 9,713,213 | B2 | * | 7/2017 | Jung ...................... H05B 45/46 |

FOREIGN PATENT DOCUMENTS

| JP | H10-6884 A | 1/1998 |
| JP | 2009-122073 A | 6/2009 |
| JP | 2009-126458 A | 6/2009 |

* cited by examiner

*Primary Examiner* — Jeffrey A Gblende
(74) *Attorney, Agent, or Firm* — Kenealy Vaidya LLP

(57) ABSTRACT

A switching module includes a switching unit and a determination unit configured to determine a function of the switching unit and an ON/OFF state of the switching unit. The switching unit is provided with a plurality of function determination resistors. The determination unit is configured to determine the function of the switching unit according to a combination of voltages applied to the plurality of function determination resistors corresponding to resistor values of the plurality of function determination resistors.

6 Claims, 6 Drawing Sheets

FIG. 3

| RESISTOR (Ω) | A/D INPUT RANGE (dec) Ta1 | PRIMARY IDENTIFIER |
|---|---|---|
| 100 | 100~105 | 0 |
| 110 | 106~110 | 1 |
| 120 | 111~115 | 2 |
| 130 | 116~124 | 3 |
| 150 | 125~133 | 4 |
| 180 | 134~142 | 5 |
| 200 | 143~148 | 6 |
| 220 | 149~154 | 7 |
| 240 | 155~160 | 8 |
| 270 | 161~166 | 9 |
| 300 | 167~172 | A |
| 330 | 173~177 | B |

FIG. 4

| T6 | T7 | IDENTIFICATION ID | SWITCHING FUNCTION |
|---|---|---|---|
| 0 | 0 | 0000001 | INTERIOR LIGHT(ON-OFF) |
| 0 | 1 | 0000010 | INTERIOR LIGHT (DOOR INTERLOCKING) |
| 0 | 2 | 0000011 | HAZARD |
| 0 | 3 | 0000100 | MIRROR HEATER |
| 0 | 4 | 0000101 | ECO-MODE |
| 0 | 5 | 0000110 | IDLE STOP CANCELLATION |
| 0 | 6 | 0000111 | VARIABLE LIGHT DISTRIBUTION HEADLAMP |
| 0 | 7 | 0001000 | ANTI-SKID FUNCTION CANCELLATION |
| 0 | 8 | 0001001 | LANE DEPARTURE WARNING CANCELLATION |
| 0 | 9 | 0001010 | COLLISION DAMAGE MITIGATION BRAKE CANCELLATION |
| 0 | A | 0001011 | DRIVER SEAT HEATER Hi |
| 0 | B | 0001100 | DRIVER SEAT HEATER Lo |
| 1 | 0 | 0001101 | PASSENGER SEAT HEATER Hi |
| 1 | 1 | 0001110 | PASSENGER SEAT HEATER Lo |
| ... | ... | ... | ... |
| A | 4 | 1111101 | REAR LEFT SEAT POWER WINDOW Open (DRIVER SEAT) |
| A | 5 | 1111110 | REAR LEFT SEAT POWER WINDOW Close (DRIVER SEAT) |

Ta2

APPARATUS FOR IDENTIFYING SWITCH OF SWITCHING MODULE

CROSS REFERENCE TO RELATED APPLICATIONS

This application claims priority from Japanese Patent Application No. 2020-038742 filed on Mar. 6, 2020, the entire contents of which are incorporated herein by reference.

BACKGROUND OF THE INVENTION

Field of the Invention

The present invention relates to a switching module including a switching unit and a determination unit configured to determine a function and an ON/OFF state of the switching

Description of Related Art

As the above switching module, for example, a control device of a vehicle-mounted device described in Patent Literature 1 has been proposed. In the control device of the vehicle-mounted device, a control instruction unit determination unit (determination unit) determines a function of a control instruction unit (switching unit) based on a detection result of a resistor value of a resistor element incorporated in the control instruction unit having a switching function.
[Patent Literature 1] JP-A-H10-6884

However, in the control device of the vehicle-mounted device described above, only one resistor element is provided in the control instruction unit. Therefore, it is necessary to prepare resistor values of resistor elements by the number of types. Therefore, there is a problem that, when there are a large number of types of control instruction units, the resistor element cannot be prepared and a type cannot be determined.

SUMMARY

One or more embodiments provide a switching module capable of easily determining a function even when the number of functions in switching units is large.

In accordance with one or more embodiments, a switching module includes a switching unit and a determination unit configured to determine a function of the switching unit and an ON/OFF state of the switching unit. The switching unit is provided with a plurality of function determination resistors. The determination unit is configured to determine the function of the switching unit according to a combination of voltages applied to the plurality of function determination resistors corresponding to resistor values of the plurality of function determination resistors.

BRIEF DESCRIPTION OF THE DRAWINGS

FIG. 3 is a diagram showing a correspondence table stored in a memory in a control circuit shown in FIG. 2.

FIG. 4 is a diagram showing a correspondence table stored in the memory in the control circuit shown in FIG. 2.

DETAILED DESCRIPTION

Specific embodiments according to the present invention will be described below with reference to the drawings.

Figure 1:
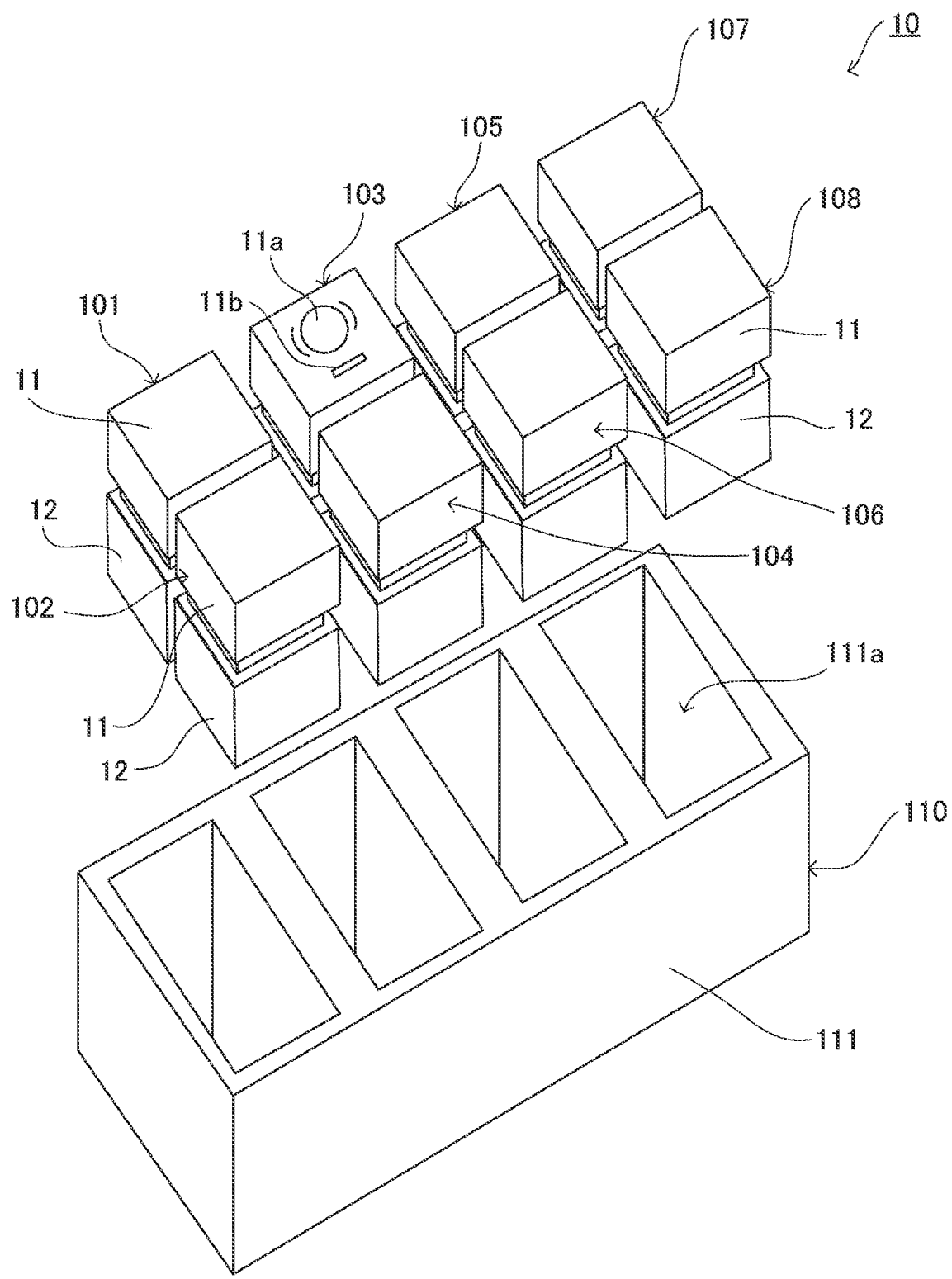
FIG. 1 is a schematic perspective view showing an embodiment of a switching module according to the present invention.

As shown in FIG. 1, a switching module 10 includes a plurality of switching units 101 to 108 operated by an occupant, and a determination unit 110 to which the switching units 101 to 108 are detachably attached and which determines ON/OFF states of the attached switching units 101 to 108. In the present embodiment, as shown in FIG. 2, the determination unit 110 is communicably connected to a body control module (BCM) 200 serving as an upper control device to be described later, and transmits the ON/OFF states of the switching units 101 to 108 to the BCM 200.

As shown in FIG. 1, each of the switching unit 101 to 108 to be described later includes an operation unit 11 that is pushed by the occupant, a switching body 12 to which the operation unit 11 is attached, and a switching substrate 13 (FIG. 2) accommodated in the switching body 12. In the present embodiment, as the switching units 101 to 108, a switching unit in which a push operation is performed will be described as an example, but the present invention is not limited thereto. As for the switching units 101 to 108, a dial operation, a seesaw operation, or the like may be performed.

As shown in FIG. 1, a functional design 11a representing a function of the switching units 101 to 108 and a lamp design 11b representing an ON/OFF state of the switching units 101 to 108 are provided on a front surface of the operation unit 11. In the example shown in FIG. 1, in order to simplify the drawing, the functional design 11a and the lamp design 11b are provided only in the switching unit 103, but in practice, the functional design 11a and the lamp design 11b are provided in all switching units 101 to 108 that function as switches.

Figure 2:
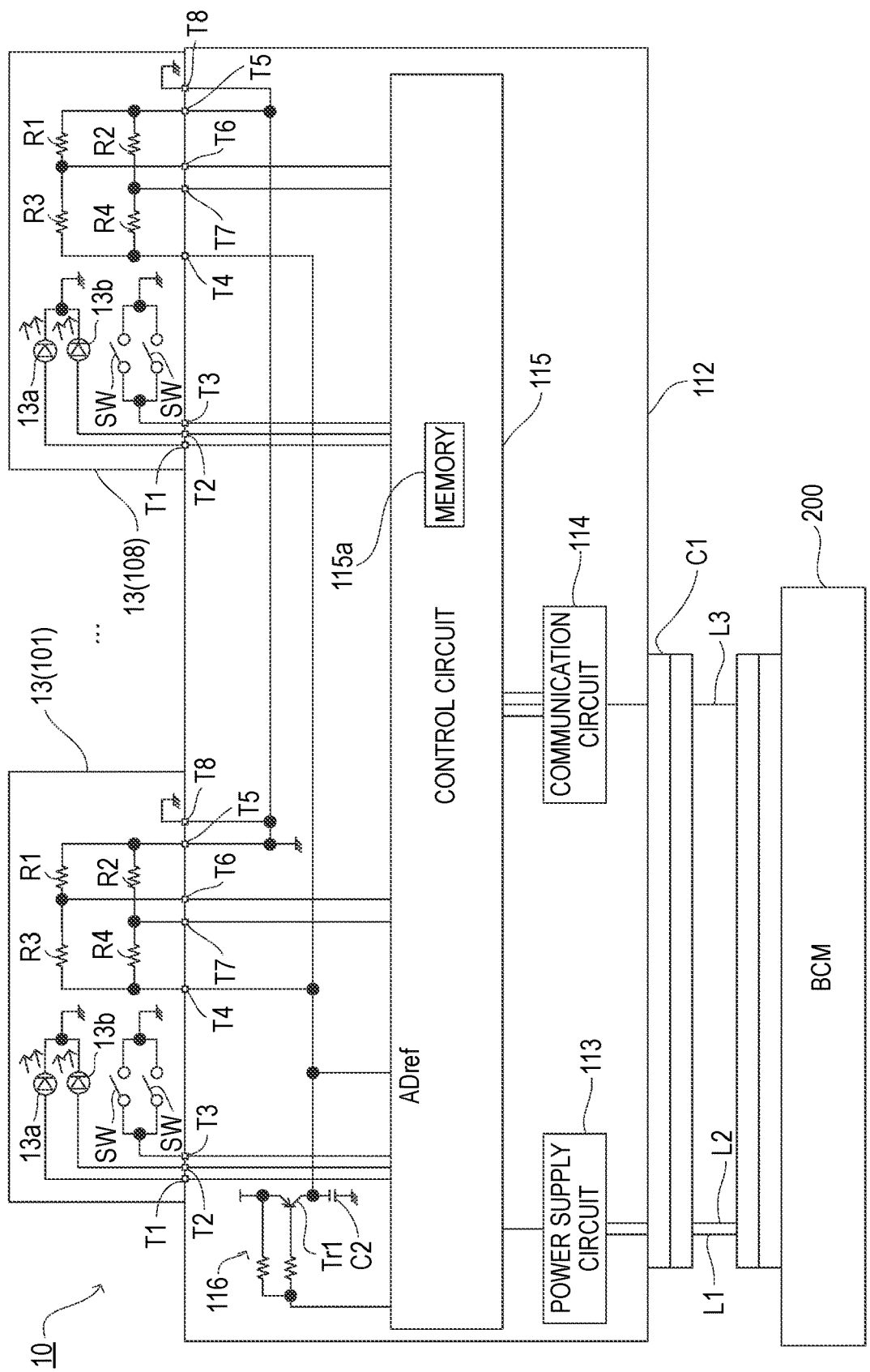
FIG. 2 is an electrical configuration diagram of the switching module shown in FIG. 1.

As shown in FIG. 2, a connector (not shown) having terminals T1 to T8 is mounted on the switching substrate 13. The switching substrate 13 can be electrically connected to the determination unit 110 to be described later, via the terminals T1 to T8.

On the switching substrate 13, an illumination LED 13a for turning on the functional design 11a, an ON/OFF LED 13b for turning on the lamp design 11b, and two switch contacts SW which are turned on/off in response to the push operation are mounted. One ends of the illumination LED 13a and the ON/OFF LED 13b are connected to a ground, and the other ends of the illumination LED 13a and the ON/OFF LED 13b are connected to the separate terminals T1 and T2. The two switch contacts SW are connected in parallel to each other, one end of each switch contact SW is connected to the ground, and the other end of each switch contact SW is commonly connected to the terminal T3.

In addition, the switching substrate 13 is mounted with two function determination resistors R1 and R2 and two voltage division resistors R3 and R4. The function determination resistor R1 and the voltage division resistor R3 are connected in series. The function determination resistor R2 and the voltage division resistor R4 are connected in series. A series circuit including the resistors R1 and R3 and a series circuit including the resistors R2 and R4 are connected in parallel. Resistor values of the two function determination resistors R1 and R2 are set so as to be a combination corresponding to a function of the switching units 101 to 108.

In the present embodiment, twelve types of resistors of 100Ω, 110Ω, 120Ω, 130Ω, 150Ω, 180Ω, 200Ω, 220Ω, 240Ω, 270Ω, 300Ω, and 330Ω are prepared as the function determination resistors R1 and R2. A combination thereof corresponding to the function of the switching units 101 to 108 is mounted on the switching units 101 to 108. Resistor values of the two voltage division resistors R3 and R4 are the same as each other, and are also the same between the plurality of switching units 101 to 108.

Both ends of the series circuit including the resistors R1 and R3 and both ends of the series circuit including the resistors R2 and R4 are commonly connected to terminals T4 and T5. The resistor R1 and the resistor R3 are connected to the terminal T6, and the resistor R2 and the resistor R4 are connected to the terminal T7. A circuit for supplying ground to the switching substrate 13 is connected to the terminal T8.

As shown in FIG. 1 and the like, the determination unit 110 includes a case 111 to which the plurality of switching units 101 to 108 are attached, and a parent substrate 112 (FIG. 2) accommodated in the case 111. The case 111 is provided with insertion holes 17a into which the switching units 101 to 108 are inserted. In the present embodiment, four insertion holes 17a are provided, and two of the switching units 101 to 108 are inserted into one insertion hole 17a.

That is, in the present embodiment, a maximum of eight switching units 101 to 108 can be attached to the determination unit 110. Certainly, it is not necessary to attach all of the eight switching units 101 to 108, and a necessary number of switching units 101 to 108 may be attached to the determination unit 110. For example, when it is necessary to attach seven switching units 101 to 107, it is considered that the switching unit 108 without the switching substrate 13 is attached as a remaining switching unit 108 to maintain an aesthetic appearance of the switching module 10.

A connector C1 for connecting to the BCM 200 is mounted on the parent substrate 112. The parent substrate 112 is connected to the BCM 200 via a power supply line L1, a ground line L2, and a multiplex communication line L3.

The parent substrate 112 includes a power supply circuit 113, a communication circuit 114, a control circuit 115, and an output circuit 116. The power supply circuit 113 is a circuit that converts power supply supplied from the BCM 200 via the power supply line L1 and the ground line L2 into power supply for the control circuit 115 and supplies the power supply to the control circuit 115. The communication circuit 114 is a circuit for communicating with the BCM 200.

The control circuit 115 is formed of a microcomputer including a well-known CPU, ROM, and RAM, and controls the entire switching module 10. The output circuit 116 includes a switching transistor Tr1 and a capacitor C2 provided between the power supply and the ground, and a base of the switching transistor Tr1 is connected to the control circuit 115. An emitter of the switching transistor Tr1 is connected to ADref of the control circuit 115. A connector (not shown) to be connector-connected to the connector having the terminals T1 to T8 provided in the switching units 101 to 108 is mounted on the parent substrate 112.

When the switching units 101 to 108 are inserted into the insertion holes 17a, connectors provided on the switching substrate 13 and connectors provided on the parent substrate 112 are connector-connected, and the switching substrate 13 and the parent substrate 112 are electrically connected. Thus, by connector-connecting the switching substrate 13 and the parent substrate 112 to each other, the switching units 101 to 108 can be detachably provided with respect to the determination unit 110. Accordingly, it is possible to easily change the function and arrangement positions of the switching units 101 to 108 in accordance with a vehicle type, a grade, and a preference of a user.

By the connector-connection, the terminals T1 and T2 are connected to output ports of the control circuit 115. Accordingly, the control circuit 115 can control turning-on of the LEDs 13a and 13b. The terminal T3 is connected to an input port of the control circuit 115. Accordingly, the control circuit 115 can determine an ON/OFF state of the switch contact SW.

The terminal T4 is connected to a connection point between the switching transistor Tr1 and the capacitor C2, and the terminal T5 is connected to the ground. Accordingly, when the control circuit 115 turns on the switching transistor Tr1, a voltage is applied to both ends of the series circuit of the resistors R1 and R3 and the series circuit of the resistors R2 and R4. The terminals T6 and T7 are connected to an AD port of the control circuit 115. An input voltage to the AD port (output voltages of the terminals T6 and T7) is a voltage corresponding to the resistor values of the function determination resistors R1 and R2. The control circuit 115 performs AD conversion on the output voltages of the terminals T6 and T7 input to the AD port. At this time, since the control circuit 115 performs the AD conversion using an emitter voltage of the switching transistor Tr1 input to ADref as a reference voltage, AD inputs of the terminals T6 and 17 can be correctly identified even if a supply voltage is changed.

As shown in FIG. 3, a memory 115a (a first storage unit and a second storage unit) of the control circuit 115 stores a correspondence table Ta1 between resistor value ranges of the function determination resistors R1 and R2, which are input ranges to the AD port, and a primary identifier. As shown in FIG. 4, the memory 115a of the control circuit 115 stores a correspondence table Ta2 between a combination of two primary identifiers and an identification ID of the switching units 101 to 108. The control circuit 115 reads A/D inputs of the AD ports connected to the terminals T6 and T7, and reads a primary identifier corresponding to the read A/D inputs from the correspondence table Ta1. Thereafter, the control circuit 115 reads an identification ID corresponding to a combination of primary identifiers of the terminals T6 and T7 read from the correspondence table Ta2. The identification ID has a one-to-one correspondence with a switching function, and the control circuit 115 can determine the function of the switches by reading the identification ID.

Figure 5:
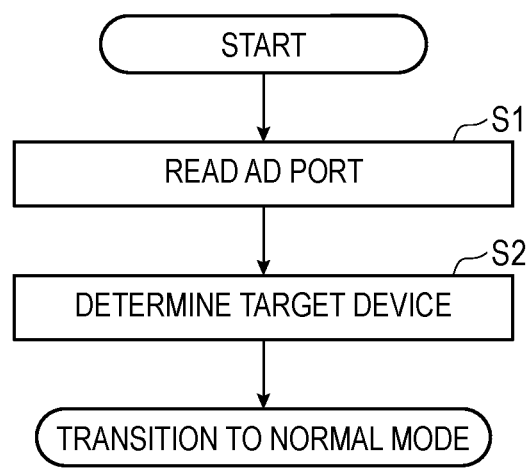
FIG. 5 is a flowchart showing a processing procedure of the control circuit shown in FIG. 2.
Figure 6:
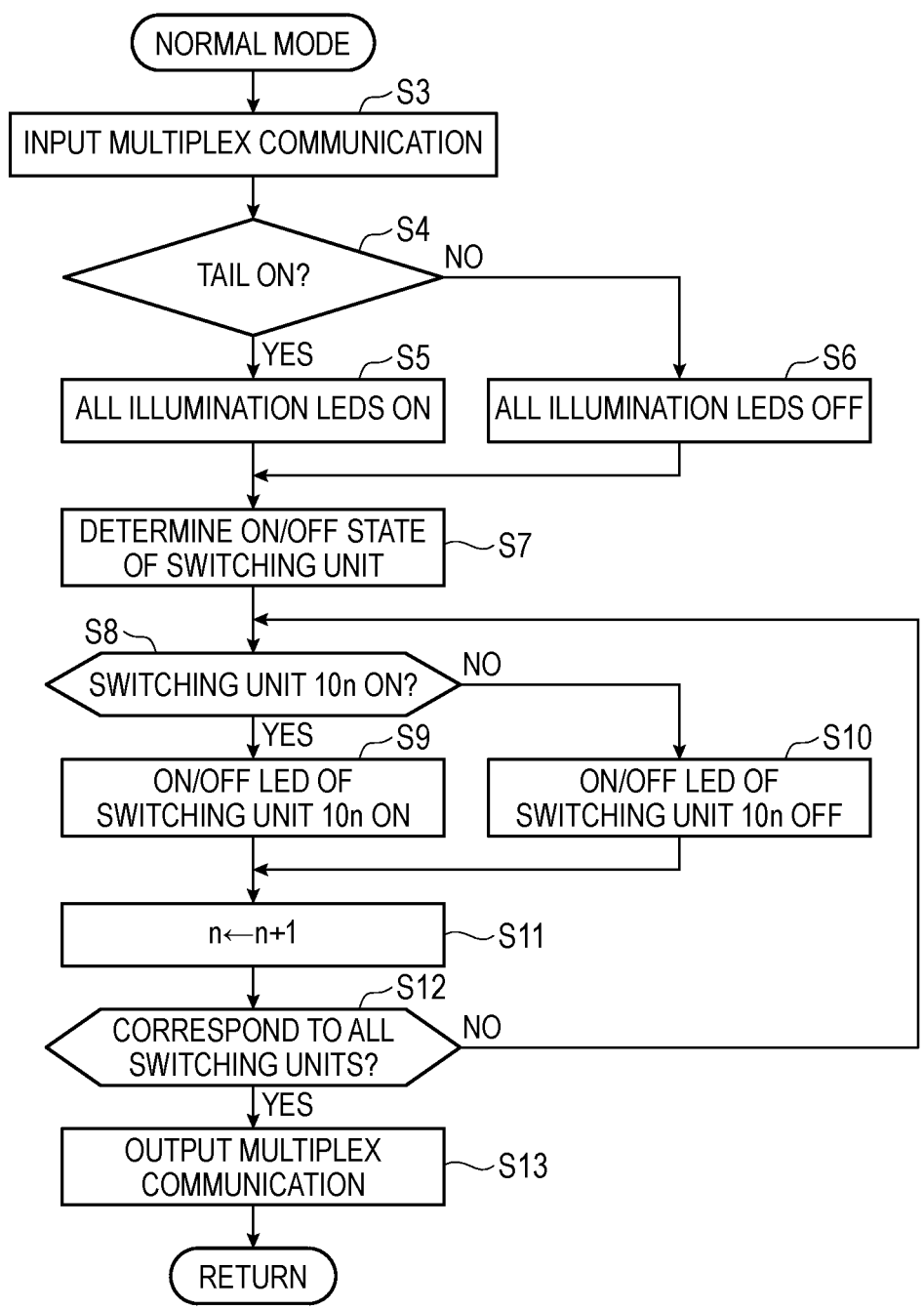
FIG. 6 is a flowchart showing a processing procedure of the control circuit shown in FIG. 2 in a normal mode.

Next, operations of the switching module 10 having the above configuration will be described below with reference to flowcharts of FIGS. 5 and 6. When the power supply is turned on, the control circuit 115 reads the AD ports connected to the terminals T6 and T7 of each of the switching units 101 to 108 (step S1), and measures the resistor values of the function determination resistors R1 and R2. Thereafter, the control circuit 115 determines the function (identification ID) of the switching units 101 to 108 with reference to the correspondence tables Ta1 and Ta2 (step S2), and then transitions to a normal mode.

In the normal mode, the control circuit 115 inputs a signal from the BCM 200 (step S3). Thereafter, when a signal indicating that a tail lamp is turned on is input from the BCM 200 (Y in step S4), the control circuit 115 turns on all illumination LEDs 13a of the switching units 101 to 108 (step S5). In contrast, when a signal indicating that the tail lamp is turned off is input from the BCM 200 (N in step S4), the control circuit 115 turns off all the illumination LEDs 13a of the switching units 101 to 108 (step S6).

Thereafter, the control circuit 115 determines the ON/OFF state of the switch contact SW of each of the switching units 101 to 108 (step S7). Next, when the switch contact SW of the switching unit 10n (in which n is an integer of 1 to 8, and n=1 in an initial stage) is turned on (Y in step S8), the control circuit 115 turns on the ON/OFF LED 13b of the switching unit 10n (step S9), and proceeds to the next step S11. On the other hand, when the switch contact SW of the switching unit 10n is turned off (N in step S8), the control circuit 115 maintains an OFF state of the ON/OFF LED 13b of the switching unit 10n (step S10), and proceeds to the next step S11.

In step S11, the control circuit 115 increments n. Thereafter, the control circuit 115 determines whether ON/OFF LEDs 13b corresponding to the ON/OFF states of all the switching units 101 to 108 are controlled (step S12). If the ON/OFF LEDs 13b do not correspond to all the switching units 101 to 108 (N in step S12), the control circuit 115 returns to step S8. If the ON/OFF LEDs 13b correspond to all the switching units 101 to 108 (Y in step S12), the control circuit 115 transmits the identification ID and the ON/OFF state of each of the switching units 101 to 108 to the BCM 200 (step S13), and then returns to step S1.

According to the above embodiment, the switching units 101 to 108 are provided with the plurality of function determination resistors R1 and R2, and the determination unit 110 determines the function of the switching units 101 to 108 according to the combination of the resistor values of the plurality of function determination resistors R1 and R2. Accordingly, it is not necessary to provide the same number of resistor values of the function determination resistors R1 and R2 as the number of functions, and it is possible to easily determine the function even when the number of functions in e switching unit 101 to 108 is large.

According to the above embodiment, the determination unit 110 can transmit the function and the ON/OFF state of the switching units 101 to 108 to the upper control device.

According to the above embodiment, the determination unit 110 can easily determine the function of the switching units 101 to 108 by reading the primary identifier from the correspondence table Ta1 and reading the identification ID from the correspondence table Tat2.

According to the above embodiment, since the voltage division resistors R3 and R4 are provided in the switching units 101 to 108, it is not necessary to provide the voltage division resistors R3 and R4 on a determination unit 110 side, and a size of determination unit 110 can be reduced.

According to the above embodiment, the switching units 101 to 108 are detachably provided with respect to the determination unit 110. Accordingly, it is possible to easily change the function of the switching units 101 to 108 connected to the determination unit 110 and an arrangement of the switching units 101 to 108.

The present invention is not limited to the embodiment described above, and modifications, improvements, and the like can be made as appropriate. In addition, materials, shapes, dimensions, numbers, arrangement positions or the like of each constituent element in the embodiment described above are optional and not limited as long as the object of the present invention can be achieved.

In the above embodiment, two function determination resistors R1 and R2 are provided in each of the switching units 101 to 108, but the present invention is not limited. thereto. If the number of functions of the switching units 101 to 108 is large, three or more function determination resistors may be provided.

In addition, in the above embodiment, the voltage division resistors R3 and R4 are also provided in the switching units 101 to 108, but the present invention is not limited thereto. The voltage division resistors R3 and R4 may be provided on the determination unit 110 side.

In addition, according to the above embodiment, the switching units 101 to 108 are detachably provided with respect to the determination unit 110, but the present invention is not limited thereto. The switching units 101 to 108 may be attached to the determination unit 110 so as not to be removed.

In addition, according to the above embodiment, the switching units 101 to 108 are provided with the functional design 11a and the lamp design 11b, but the present invention is not limited thereto. Only the functional design 11a may be provided.

Here, characteristics of the above embodiment of the switching module according to the present invention will be briefly summarized and listed in the following [1] to [5].

[1] A switching module (10) comprising:
a switching unit (101 to 108); and
a determination unit configured to determine a function of the switching unit (101 to 108) and an ON/OFF state of the switching unit (101 to 108),
wherein the switching unit (101 to 108) is provided with a plurality of function determination resistors (R1, R2), and
wherein the determination unit determines the function of the switching unit (101 to 108) according to a combination of voltages applied to the plurality of function determination resistors (R1, R2) corresponding to resistor values of the plurality of function determination resistors (R1, R2).

[2] The switching module (10) according to [1],
wherein the determination unit is configured to transmit the function and a determination result of the ON/OFF state of the switching unit (101 to 108) to an upper control device (200).

[3] The switching module (10) according to [1] or [2], further comprises:
a first storage unit (115a) storing a first correspondence table (Ta1) between resistor value ranges of the plurality of function determination resistors (R1, R2) and a primary identifier; and
a second storage unit (115a) storing a second correspondence table (Ta2) between a combination of a plurality of primary identifiers and an identification ID of the switching unit (101 to 108),
wherein the determination unit is configured to read the plurality of primary identifiers from the first storage unit (115a), read the identification ID corresponding to the combination of the plurality of primary identifiers from the second storage unit (115a), and determine the function of the switching unit (101 to 108).

[4] The switching module (10) according to any one of [1] to [3],
wherein the switching unit (101 to 108) is provided with voltage division resistors (R3, R4) connected in series to the plurality of function determination resistors (R1, R2) respectively, and
wherein the determination unit is configured to determine the function of the switching unit (101 to 108) based on electric potentials between the function determination resistors (R1, R2) and the voltage division resistors (R3, R4).

[5] The switching module (10) according to any one of [1] to [4], wherein the switching unit (101 to 108) is detachably provided with the determination unit.

According to the aspect [1], the switching unit is provided with the plurality of function determination resistors, and the determination unit determines the function of the switching unit according to the combination of the voltages corresponding to the resistor values of the plurality of function determination resistors. Accordingly, it is not necessary to provide the same number of resistor values of the function determination resistors as the number of functions, and it is possible to easily determine the function even when the number of functions in the switching unit is large.

According to the aspect [2], the determination unit can transmit the determination result of the function and the ON/OFF state of the switching unit to the upper control device.

According to the aspect [3], the determination unit can easily determine the function of the switching unit by reading the primary identifier from the first storage unit and reading the identification ID from the second storage unit.

According to the aspect [4], since the voltage division resistor is provided in the switching unit, it is not necessary to provide the voltage division resistor on a determination unit side, and a size of determination unit can be reduced.

According to the aspect [5], the switching unit is detachably provided with respect to the determination unit. Accordingly, it is possible to easily change the function of the switching unit connected to the determination unit and an arrangement of the switching unit.

According to one or more embodiments, it is possible to provide a switching module capable of easily determining a function even when the number of functions in switching units is large.

What is claimed is:

1. A switching module comprising:
    a switching unit; and
    a determination unit configured to determine a function of the switching unit and an ON/OFF state of the switching unit,
    wherein the switching unit is provided with a plurality of function determination resistors, and
    wherein the determination unit is configured to determine a switch identification of the switching unit from a plurality of identification IDs according to a combination of voltages applied to the plurality of function determination resistors corresponding to resistor values of the plurality of function determination resistors.

2. The switching module according to claim 1,
    wherein the determination unit is configured to transmit the switch identification and the ON/OFF state of the switching unit to an upper control device.

3. The switching module according to claim 1, further comprises:
    a first storage unit storing a first correspondence table between resistor value ranges of the plurality of function determination resistors and a plurality of primary identifiers; and
    a second storage unit storing a second correspondence table between a plurality of combination identifiers and the plurality of identification IDs of the switching unit,
    wherein the determination unit is configured to determine the switch identification by,
        reading a respective one of the plurality of primary identifiers from the first storage unit for each of the function determination resistors,
        selecting one of the combination identifiers from the second storage unit based on the primary identifiers read from the first storage unit, and
        reading a respective one of the identification IDs corresponding to the one of the combination identifiers from the second storage unit.

4. The switching module according to claim 1,
    wherein the switching unit is provided with voltage division resistors connected in series to the plurality of function determination resistors respectively, and
    wherein the determination unit is configured to determine the function of the switching unit based on electric potentials between the function determination resistors and the voltage division resistors.

5. The switching module according to claim 1,
    wherein the switching unit is detachably connected to the determination unit by a plurality of terminals.

6. The switching module according to claim 1,
    wherein the detection unit includes a case and the switching unit is mounted in the case.

* * * * *